United States Patent
Sugai (10) Patent No.: US 10,974,706 B2
(45) Date of Patent: Apr. 13, 2021

(54) VEHICLE ORIENTATION CONTROL DEVICE

(71) Applicant: NTN CORPORATION, Osaka (JP)

(72) Inventor: Tomohiro Sugai, Iwata (JP)

(73) Assignee: NTN CORPORATION, Osaka (JP)

( * ) Notice: Subject to any disclaimer, the term of this patent is extended or adjusted under 35 U.S.C. 154(b) by 685 days.

(21) Appl. No.: 15/566,466

(22) PCT Filed: Apr. 5, 2016

(86) PCT No.: PCT/JP2016/061179
§ 371 (c)(1),
(2) Date: Dec. 20, 2017

(87) PCT Pub. No.: WO2016/167162
PCT Pub. Date: Oct. 20, 2016

(65) Prior Publication Data
US 2018/0099677 A1    Apr. 12, 2018

(30) Foreign Application Priority Data

Apr. 14, 2015  (JP) .............................. JP2015-082309

(51) Int. Cl.
*B60T 8/1755*  (2006.01)
*B60L 15/20*  (2006.01)
(Continued)

(52) U.S. Cl.
CPC ............ *B60T 8/1755* (2013.01); *B60L 15/20* (2013.01); *B60T 8/1769* (2013.01);
(Continued)

(58) Field of Classification Search
CPC .......... B60C 9/18; B60L 15/20; B60T 8/1755; B60T 8/1769; B60T 2270/302;
(Continued)

(56) References Cited

U.S. PATENT DOCUMENTS 5,667,286 A * 9/1997 Hoying et al. ........ B60T 8/1755
                                                303/140
5,720,533 A * 2/1998 Pastor et al. .......... B60T 8/1755
                                                303/147
(Continued)

FOREIGN PATENT DOCUMENTS

CN        1946586       4/2007
EP        1 864 879 A1  12/2007
(Continued)

OTHER PUBLICATIONS

Notifications of Reasons for Refusal dated Jan. 29, 2019 in corresponding Japanese Patent Application No. 2015-082309, 4 pages.
(Continued)

*Primary Examiner* — Dale W Hilgendorf (57) ABSTRACT

A vehicle orientation control device is provided in a four wheel drive vehicle capable of applying braking and driving force to each of the vehicle wheels. The vehicle orientation control device (24) is provided in a vehicle control device (10) for controlling the four wheel drive vehicle and includes a standard yaw rate calculating unit (25), a yaw rate sensor (22), a target yaw moment calculating unit (26), a braking and driving force commanding unit (15), and a yaw moment control unit (27). The yaw moment control unit (27) includes an allocation ratio varying unit (27a) for continuously changing the front and rear allocation ratio of the yaw moment control torque to be distributed to the front and rear wheels (3) and (2) in dependence on the detected actual yaw rate that is detected by the yaw rate sensor (22).

9 Claims, 8 Drawing Sheets

(51) Int. Cl.
*B60T 8/1769* (2006.01)
*B60W 10/184* (2012.01)
*B60W 30/18* (2012.01)

(52) U.S. Cl.
CPC ....... *B60T 8/17551* (2013.01); *B60W 10/184* (2013.01); *B60W 30/18181* (2013.01); *B60T 2250/03* (2013.01); *B60T 2270/302* (2013.01); *B60W 2300/18* (2013.01); *B60W 2520/105* (2013.01); *B60W 2520/14* (2013.01); *B60W 2720/24* (2013.01); *B60W 2720/30* (2013.01); *Y02T 10/72* (2013.01)

(58) Field of Classification Search
CPC ............. B60T 8/17551; B60T 2250/03; B60T 9/1755; B60W 10/184; B60W 2300/18; B60W 2520/105; B60W 2520/14; B60W 2720/24; B60W 2720/30; B60W 30/18181; Y02T 10/7275; Y02T 10/72
See application file for complete search history.

(56) References Cited

U.S. PATENT DOCUMENTS

| | | | | |
|---|---|---|---|---|
| 6,212,460 | B1* | 4/2001 | Rizzo et al. | B60T 8/1755 701/70 |
| 6,325,469 | B1* | 12/2001 | Carson et al. | B60T 8/1755 303/140 |
| 7,762,562 | B2 | 7/2010 | Sugiyama | |
| 7,890,239 | B2 | 2/2011 | Fujita | |
| 7,909,416 | B2 | 3/2011 | Maeda et al. | |
| 2007/0088484 | A1* | 4/2007 | Fujita | B60W 10/18 701/41 |
| 2008/0029987 | A1 | 2/2008 | Sugiyama | |
| 2008/0183353 | A1* | 7/2008 | Post et al. | B60W 10/184 701/42 |
| 2009/0051216 | A1* | 2/2009 | Maeda et al. | B60T 8/1755 303/146 |
| 2009/0236905 | A1 | 9/2009 | Maeda et al. | |
| 2015/0105978 | A1* | 4/2015 | Nakatsu | B60W 2720/30 701/37 |

FOREIGN PATENT DOCUMENTS

| | | |
|---|---|---|
| JP | 3-70633 | 3/1991 |
| JP | 9-86378 | 3/1997 |
| JP | 11-324756 | 11/1999 |
| JP | 2007-131297 | 5/2007 |
| JP | 2009-274528 | 11/2009 |
| JP | 2012-91545 | 5/2012 |
| WO | WO 2012/023162 A1 | 2/2012 |

OTHER PUBLICATIONS

International Preliminary Report on Patentability dated Oct. 26, 2017 in corresponding International Patent Application No. PCT/JP2016/061179.
Extended European Search Report dated Nov. 23, 2018 in corresponding European Application No. 16779953.5.
International Search Report dated Jun. 28, 2016 in corresponding International Patent Application No. PCT/JP2016/061179.
Chinese Office Action dated Sep. 4, 2019 in corresponding Chinese Patent Application No. 201680033844.3.

* cited by examiner

BRAKING AND DRIVING FORCE OF EACH WHEEL
(AT THE TIME OF RIGHT-TURN AND UNDERSTEERING)

STANDARD YAW RATE AND ACTUAL YAW RATE (B)

VEHICLE ORIENTATION CONTROL DEVICE

CROSS REFERENCE TO THE RELATED APPLICATIONS

This application is a U.S. National Stage Application which claims the benefit under 35 U.S.C. 371 of PCT International Application No. PCT/JP2016/061179, filed Apr. 5, 2016, which claims the foreign priority benefit under 35 U.S.C. § 119 to Japanese patent application No. 2015-082309, filed Apr. 14, 2015, the entire disclosures of which are herein incorporated by reference as a part of this application.

BACKGROUND OF THE INVENTION

Field of the Invention

The present invention relates to a vehicle orientation control device designed to stabilize vehicle orientation by properly allocating the braking and driving force to be applied to left and right front wheels and left and right rear wheels all employed in an automotive vehicle with a four wheel drive system, i.e., in a four wheel drive vehicle.

Description of Related Art

The conventional vehicle orientation control device is so designed as to determine a target yaw rate from various state quantities of the automotive vehicle such as vehicle speed and/or steering angle, then generating a target yaw moment on the basis of the deviation between the target yaw rate and an actual yaw rate, and applying a necessary braking and driving force to each of the left and right front and rear wheels in order to realize the target yaw moment. By so doing, the stabilized vehicle behavior can be secured. In this respect, see Patent Document 1 referred to below.

The four wheel drive vehicle is also known which control is made based on the deviation between the target yaw rate and the actual yaw rate to thereby change the ratios of distribution of the driving force to the front wheels and the rear wheels, respectively, to enable the actual yaw rate to coincide with or approximate to the target yaw rate. For example, the technique in which, in the event that the actual yaw rate is higher than the target yaw rate, the torque distribution to the front wheel side is increased, but in the event that the actual yaw rate is lower than the target yaw rate, the torque distribution to the rear wheel side is increased, is known. In this respect, see Patent Document 2 referred to below.

LIST OF PRIOR ART DOCUMENTS

Patent Documents

Patent Document 1: JP Laid-open Patent Publication No. H09-86378
Patent Document 2: JP Laid-open Patent Publication No. H03-70633

In an automotive vehicle, such as an automotive vehicle with a four wheel independent drive system, in which front and rear driving forces are separately controllable, or an automotive vehicle in which the driving force to all of the four wheels can be distributed, if the front and rear driving forces necessitated to enable the target yaw moment based on the deviation between the target yaw rate and the actual yaw rate, such as employed in the technique disclosed in Patent Document 1 referred to above, are distributed to the front and rear wheels on the basis of the deviation between the target yaw rate and the actual yaw rate such as employed in the technique disclosed in Patent Document 2 referred to above, the distribution of the driving forces to the front wheel and the rear wheel changes when the sign of the actual yaw rate inverts. For this reason, the torques on the front and rear wheels may change discontinuously and, therefore, there is a possibility that the vehicle driver may have a sense of discomfort.

SUMMARY OF THE INVENTION

In view of the foregoing, the present invention has an essential object to provide a vehicle orientation control device for use in a four wheel drive vehicle of a type in which the braking and driving force are individually applied to each of the four wheels, which device is capable of stabilizing the vehicle orientation without allowing the vehicle driver to have a sense of discomfort.

Hereinafter, for the purpose of facilitating the understanding of the present invention, the following description is made with the use of reference symbols used in the description of an embodiment of the present invention.

A vehicle orientation control device 24 of the present invention is a vehicle orientation control device provided in a vehicle control device 10 configured to control a four wheel drive vehicle equipped with a braking and driving force generating unit 4 designed to individually apply braking and driving force to each of front left and right wheels 3 and 3 and rear left and right wheels 2 and 2, which device 24 includes:

a standard yaw rate calculating unit 25 configured to determine a standard yaw rate from a vehicle speed and a steering angle;

a yaw rate sensor 22 configured to detect an actual yaw rate of the automotive vehicle;

a target yaw moment calculating unit 26 configured to calculate a target yaw moment on the basis of a yaw rate deviation between the standard yaw rate, determined by the standard yaw rate calculating unit 25, and the actual yaw rate, detected by the yaw rate sensor 22;

a braking and driving force commanding unit 15 configured to generate a command input torque of the braking and driving force to be distributed to each of the wheels 3 and 2 on the basis of state quantities outputted respectively from operating units 17 and 18 of the braking and driving force; and a yaw moment control unit 27 configured to add a yaw moment control torque, which is necessary to realize the target yaw moment calculated by the target yaw moment calculating unit 26, to the command input torque of the braking and driving force generated by the braking and driving force commanding unit 15.

The yaw moment control unit 27 referred to above includes an allocation ratio varying unit 27a for continuously changing a front and rear allocation ratio of the yaw moment control torque to be distributed to the front and rear wheels 3 and 2 in dependence on the actual yaw rate, which is determined or detected as discussed above, in the event that the actual yaw rate, which has been detected by the yaw rate sensor 22, is within a predetermined region in which positive and negative of the sign change to each other. The meaning of the braking and driving force contains a braking force or a driving force. The meaning of the braking and driving acceleration contains a braking acceleration or a driving acceleration.

The predetermined region referred above is determined by, for example, results of tests and/or simulations conducted separately.

According to the construction referred to above, the target yaw moment calculating unit 26 referred to above calculates the target yaw moment $M_t$ on the basis of the yaw rate deviation $\Delta\gamma$ between the determined standard yaw rate and the detected actual yaw rate. The yaw moment control unit 27 referred to above adds the yaw moment control torque, which is necessary to realize the calculated target yaw moment $M_t$, to the command input torque of the braking and driving force generated by the braking and driving force commanding unit 15.

The allocation ratio varying unit 27a of the yaw moment control unit 27 referred to above is operable to continuously change the front and rear allocation ratios of the yaw moment control torque to be distributed to the front and rear wheels 3 and 2 in dependence on the actual yaw rate $\gamma$, detected as hereinabove described, in the event that the actual yaw rate $\gamma$ so detected is within the predetermined region ($-\gamma_2 \leq \gamma \leq \gamma_1$) in which positive and negative of the sign invert. When the sign of the actual yaw rate $\gamma$ inverts in the way as discussed above, the front and rear allocation ratios of the yaw rate moment control torques to be distributed to the front and rear wheels 3 and 2 change continuously and, therefore, the vehicle orientation can be stabilized without allowing the vehicle driver to have a sense of discomfort. Also, by setting and adjusting parameters of the front and rear allocation ratios in dependence on the vehicle characteristics, the front and rear acceleration rates and other factors, the response of the yaw rate can be improved. It is to be noted that the term "continuously" referred to hereinbefore and hereinafter is intended to encompass not only a linear change, but also a quadric curve or the like in which the front and rear allocation ratio changes differentiably.

The yaw moment control unit 27 referred to above may be so designed as to operate;

to add the yaw moment control torque, which is necessary to realize the target yaw moment, only to the front wheel 3 in response to the command input torque from the braking and driving force commanding unit 15 in the event that the target yaw moment referred to above is negative and the actual yaw rate is higher than the preset yaw rate $\gamma_1$ (wherein $\gamma_1 > 0$), and to add the yaw moment control torque, which is necessary to realize the target yaw moment, only to the rear wheel 2 in response to the command input torque from the braking and driving force commanding unit 15 in the event that the target yaw moment referred to above is negative and the actual yaw rate is lower than the separately preset yaw rate $-\gamma_2$ (wherein $\gamma_2 > 0$), which is preset separately of the preset yaw rate $\gamma_1$.

The yaw moment control unit 27 referred to above, when generating a right-hand yaw moment, determines the occurrence of an over steering when the target yaw moment is negative (with $M_t < 0$) and the actual yaw rate is high than the yaw rate $\gamma_1$ (wherein $\gamma_1 > 0$), and then adds the yaw moment control torque only to the front wheel 3 in response to the command input torque. Accordingly, the vehicle orientation can be stabilized during the occurrence of the over steering with the vehicle being steered clockwise. The yaw moment control unit 27, when generating the right-hand yaw moment, determines the occurrence of an under steering, when the actual yaw rate is lower than the yaw rate $-\gamma_2$ (wherein $\gamma_2 > 0$), and then adds the yaw moment control torque only to the rear wheel 2 in response to the command input torque. Accordingly, the vehicle orientation can be stabilized during the under steering with the vehicle being steered clockwise.

The yaw moment control unit 27 referred to above may be so designed that as to operate;

to add the yaw moment control torque, which is necessary to realize the target yaw moment, only to the rear wheel 2 in response to the command input torque from the braking and driving force commanding unit 15 in the event that the target yaw moment referred to above is positive and the actual yaw rate referred to above is higher than the preset yaw rate $\gamma_2$ (wherein $\gamma_2 > 0$), and to add the yaw moment control torque, which is necessary to realize the target yaw moment, only to the front wheel 3 in response to the command input torque from the braking and driving force commanding unit 15 in the event that the target yaw moment referred to above is positive and the actual yaw rate referred to above is lower than the separately preset yaw rate $-\gamma_1$ (wherein $\gamma_1 > 0$), which is preset separately of the preset yaw rate $\gamma_2$.

The yaw moment control unit 27 referred to above, when generating a left hand yaw moment, determines the occurrence of an under steering when the target yaw moment is positive (wherein $M_t > 0$) and the actual yaw rate is high than the yaw rate $\gamma_2$ (wherein $\gamma_2 > 0$), and then adds the yaw moment control torque only to the rear wheel 2 in response to the command input torque. Accordingly, the vehicle orientation can be stabilized during the occurrence of the under steering with the vehicle being steered counterclockwise. The yaw moment control unit 27 referred to above, when generating the left hand yaw moment, determines the occurrence of an over steering when the actual yaw rate is lower than the yaw rate $-\gamma_1$ (wherein $\gamma_1 > 0$), and then adds the yaw moment control torque only to the front wheel 3 in response to the command input torque. Accordingly, the vehicle orientation can be stabilized during the occurrence of the over steering with the vehicle being steered counterclockwise.

The yaw moment control unit 27 referred to above may be so designed as to be operated such that the yaw rate $\gamma_1$ is set to be higher than the yaw rate $\gamma_2$. Respective preset yaw rate values $\gamma_1$ and $\gamma_2$ are determined and set in dependence on vehicle characteristics such as the position of the center of gravity of the automotive vehicle, cornering power and/or other factors. In such case, during the straight run at which the actual yaw rate approximates to zero, the front and rear allocation ratio of the braking and driving force for the rear wheel 2 can be increased to a value higher than that for the front wheel 3. Accordingly, the tendency of understeering at the period from the straight run to the start of steering can be suppressed and the response of the yaw rate can be improved.

Provision of a front and rear acceleration sensor 23 for detecting the front and rear acceleration of the automotive vehicle discussed above may be made and the yaw moment control unit 27 may be so designed that the yaw rate $\gamma_1$ is increased and the yaw rate $\gamma_2$ is decreased, with increase of the front and rear acceleration detected by the front and rear acceleration sensor 23. In this case, as the acceleration with which the automotive vehicle forward driven increases, the yaw rate $\gamma_1$ is increased and the yaw rate $\gamma_2$ is lowered. In other words, the yaw rates $\gamma_1$ and $-\gamma_2$ are increased while the yaw rates $\gamma_2$ and $-\gamma_1$ are lowered, thereby increasing the front and rear allocation ratio of the braking and driving force for the rear wheel 2. By so doing, influences which are brought about by lowering of the grip force with decrease of the load on the front wheel 3 can be reduced and, hence, the vehicle behavior can be stabilized.

The yaw moment control unit 27 referred to hereinabove may be so designed that:

the yaw moment control unit adds the yaw moment control torque, necessary to realize the target yaw moment, to a contra-wheel which is on the side opposite to a wheel of interest with respect to the front and rear, but on the same side of the wheel of interest with respect to the left and right, in the event that the yaw moment control torque necessary to realize the target yaw moment in the wheel of interest has a sign different from that of the command input torque from the braking and driving force commanding unit on the contra-wheel;

and wherein, when the sum of the command input torque, from the braking and driving force commanding unit 15, and the yaw moment control torque, required to realize the target yaw moment, does not exceed over zero, the value thereof is rendered to be a braking and driving force (command output torque) to be distributed to such contra-wheel;

and, when the sum of the command input torque, from the braking and driving force commanding unit 15, and the yaw moment control torque, required to realize the target yaw moment, exceeds over zero, the braking and driving force (command output torque) to be distributed to such contra-wheel is rendered to be zero and the increment over zero is added to the wheel of interest.

According to the above construction, the magnitude of the absolute value of the torque of the contra-wheel on the side opposite to wheel of interest, to which the yaw moment control torque is applied, with respect to the front and rear, can be lowered. Accordingly, the vehicle characteristics such as understeering and oversteering can be reduced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1A:
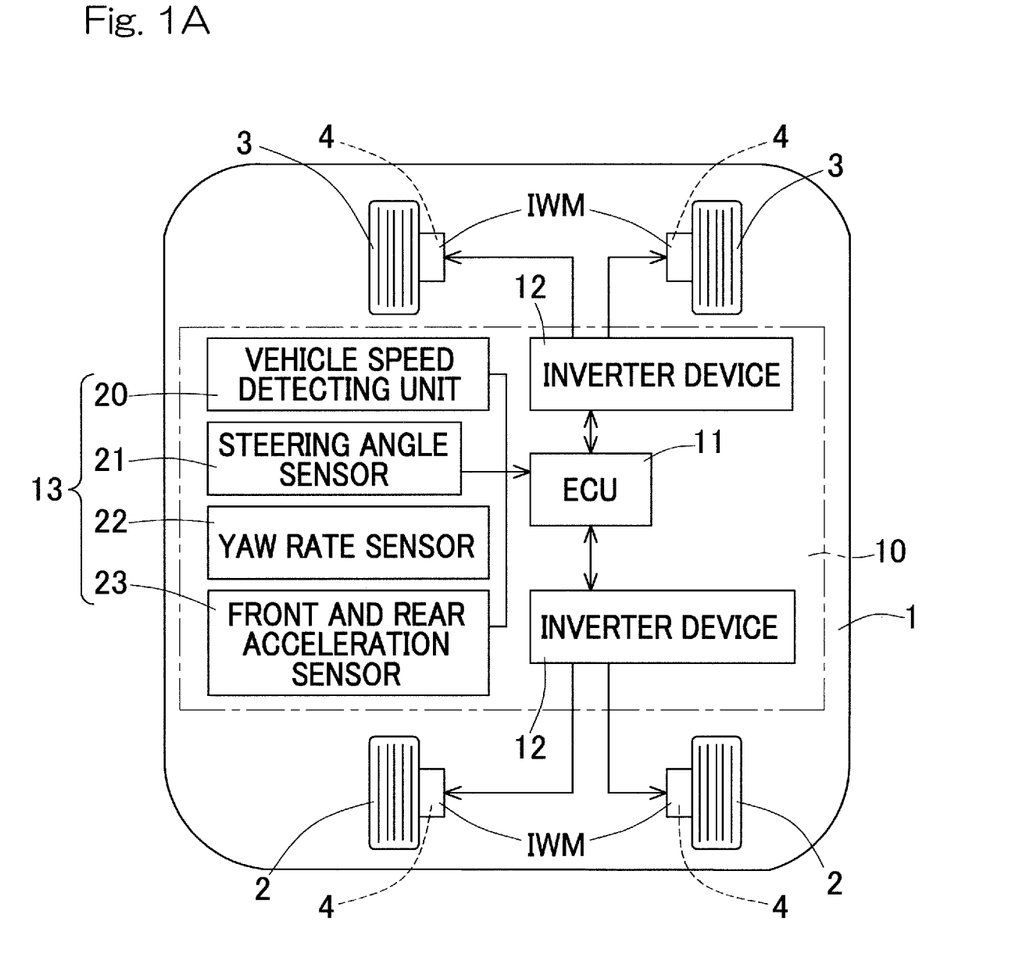
FIG. 1A is a schematic diagram showing, in a plan view, a system construction of a vehicle orientation control device designed in accordance with an embodiment of the present invention.

A vehicle orientation control device designed in accordance with an embodiment of the present invention will now be described in detail with particular reference to FIGS. 1A to 6. It is to be noted that the description that follows is intended to connote the description of a vehicle orientation control method. FIG. 1A is a schematic diagram showing, in a plan view, a system construction of the vehicle orientation control device designed in accordance with this embodiment. An electric motorcar 1 shown is of a left and right wheel independent drive vehicle on which the vehicle orientation control device of the present invention is mounted, and is also of a four wheel independent drive type (four wheel drive vehicle) in which wheels 2, which form respective left and right rear wheels of the motorcar or vehicle, and wheels 3, which form respective left and right front wheels thereof, are independently driven by associated electric motors 4 which form respective drive sources. The wheels 3 forming the respective front wheels are rendered to be steering wheels. Each of the electric motors 4 form a braking and driving force generating portion capable of exerting a braking force and a driving force. The wording driving force and the braking force are collectively referred to as a "braking and driving force" hereinabove and hereinafter.

Figure 2:
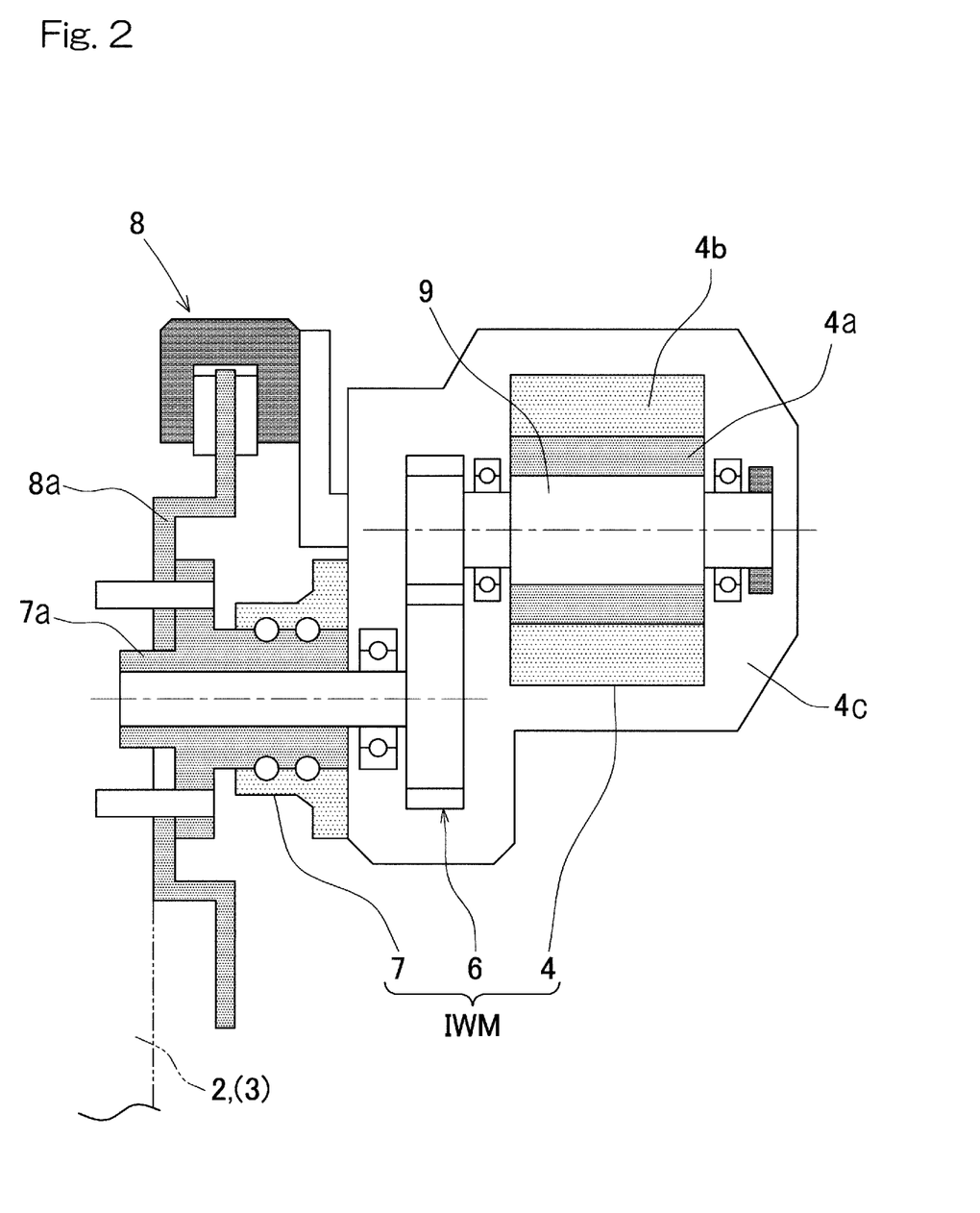
FIG. 2 is a sectional view showing an in-wheel motor drive device employed in the automotive vehicle.

Each of the motors 4 forms, for example, an in-wheel motor drive device IWM in the practice of the embodiment herein referred to. As shown in FIG. 2, the in-wheel motor drive device IWM includes a motor 4, a speed reducing gear or speed reducer 6 and a wheel bearing 7, all or a part thereof being disposed inside the respective wheel 2 (3). Rotation of the motor 4 is transmitted to the wheel 2 (3) through the speed reducing gear 6 and the wheel bearing 7. The wheel bearing 7 has a hub wheel 7a carrying a brake rotor 8a forming a friction brake device 8 and fixed to a flanged portion of the hub wheel 7a, the brake rotor 8a being rotatable together with the wheel 2 (3). The motor 4 is in the form of, for example, a magnet embedded type synchronous motor having a permanent magnet built in a core portion of the rotor 4a. This motor 4 is of a type including a gap, in a radial direction, defined between a stator 4b, which is fixed to a housing 4c, and the above described rotor 4a fixed to a rotation output shaft 9.

A control system will now be described with particular reference to FIGS. 1A and 1B. The vehicle control device 10 shown in FIG. 1A is provided with a vehicle orientation control device, as will be described later, configured to perform a control necessary to stabilize the vehicle orientation. The vehicle control device 10 includes an ECU (Electrical Control Unit) 11 mounted on the automotive vehicle, and a plurality of, for example, two inverter devices 12 provided respectively in association with a front pair of the motors 4 and a rear pair of the motors 4, and sensors 13.

Figure 1B:
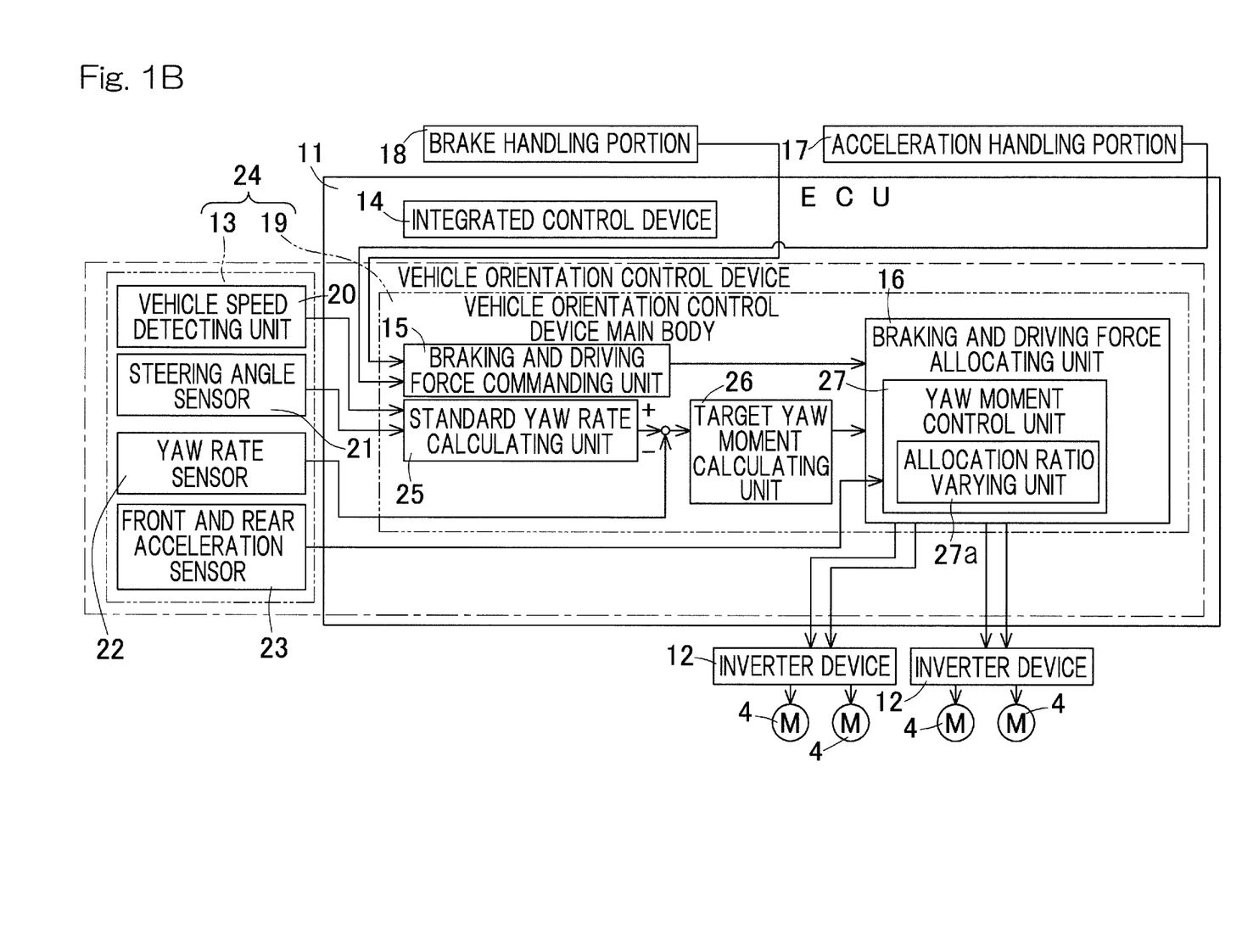
FIG. 1B is a diagram showing in detail an important portion of the system construction.

As shown in FIG. 1B, the ECU 11 includes an integrated control unit 14 capable of performing an integrated control and a harmonized control of the automotive vehicle, a braking and driving force commanding unit 15, and a braking and driving force allocating unit 16. The braking and driving force commanding unit 15 generates a command input torque of the braking and driving force in the automotive vehicle in its entirety with reference to a detection signal descriptive of the operational amount of an accelerator handling portion 17 such as an accelerator pedal and a detection signal descriptive of the operational amount of a brake handling portion 18 such as a brake pedal and with the utilization of a LUT (Look Up Table) embodied by software and hardware or predetermined convert functions accommodated in a software library or hardware or the like equivalent thereto (which are hereinafter referred to as a "realization model"). The braking and driving force allocating unit 16 is made up of software function in a processor (not shown) or hardware circuits capable of allocating and outputting command output torques each to the inverter device 12 for the associated front or rear pair of the motors 4 in accordance with a preset rule, from the command input torque to be fed from the braking and driving force commanding unit 15 to the associated wheels 2 and 3 (FIG. 1A) and the yaw moment control torque (as will be described later) for the wheels 2 and 3 (FIG. 1A), specifically with the utilization of the realization model discussed previously.

Each of the inverter devices 12 converts a direct electric power of a battery, not shown, to an alternating electric power necessary to drive the motors 4, includes a control section (not shown) for controlling outputs thereof, and is operable to control the relevant motor 4 in accordance with the command output torque so distributed as discussed above. The inverter device 12 is, in the instance as shown, employed one for each of the front and rear pairs of the two motors 4, but each of the front and rear inverter devices 12 has a structure incorporated therein for controlling the left and right motors 4 and 4 individually. By way of example, each of the inverter devices 12 is of such a design that a power circuit section (not shown) such as a gate circuit for a switching element used to convert the direct power into the alternating power may be separately provided for the left and right motors 4 and 4 and that one control section alone of the power circuit section may control the left and right power control sections on the basis of, for example, time sharing. The inverter device 12 referred to above, which has been shown and described as employed in two, may be employed one for each motor 4 totaling to the use of the four inverter devices.

ECU 11 is made up of a computer having a processor such as a microcomputer, a read only memory (ROM) having a software program that can be executed by the processor, and various electronic circuits including, for example, a random access memory (RAM) and a Co-Processor. ECU 11 and each of the inverter devices 12 are connected with each other by means of an in-car communication network such as CAN (Control Area Network). ECU 11 referred to above is provided with an orientation control device main body 19. Also, the automotive vehicle is provided with a vehicle speed detecting unit 20 configured to detect the speed of movement of the automotive vehicle, a steering angle sensor 21 configured to detect the steering angle, a yaw rate sensor 22 configured to detect the yaw rate and a front and rear acceleration sensor 23 configured to detect the front and rear acceleration, as sensors 13. The steering angle sensor 21 may be employed in the form of a sensor configured to detect the steering angle of the steering portion such as a steering wheel not shown or a sensor configured to detect the steering angle from a steering device configured to steer the wheels 2 and 3 not shown.

The vehicle orientation control device 24 is made up of at least the orientation control device main body 19 and the sensors 13 referred to previously. The orientation control device main body 19 is made up of the braking and driving force commanding unit 15, the standard yaw rate calculating unit 25, the target yaw moment calculating unit 26 and the braking and driving force allocating unit 16.

Figure 3:
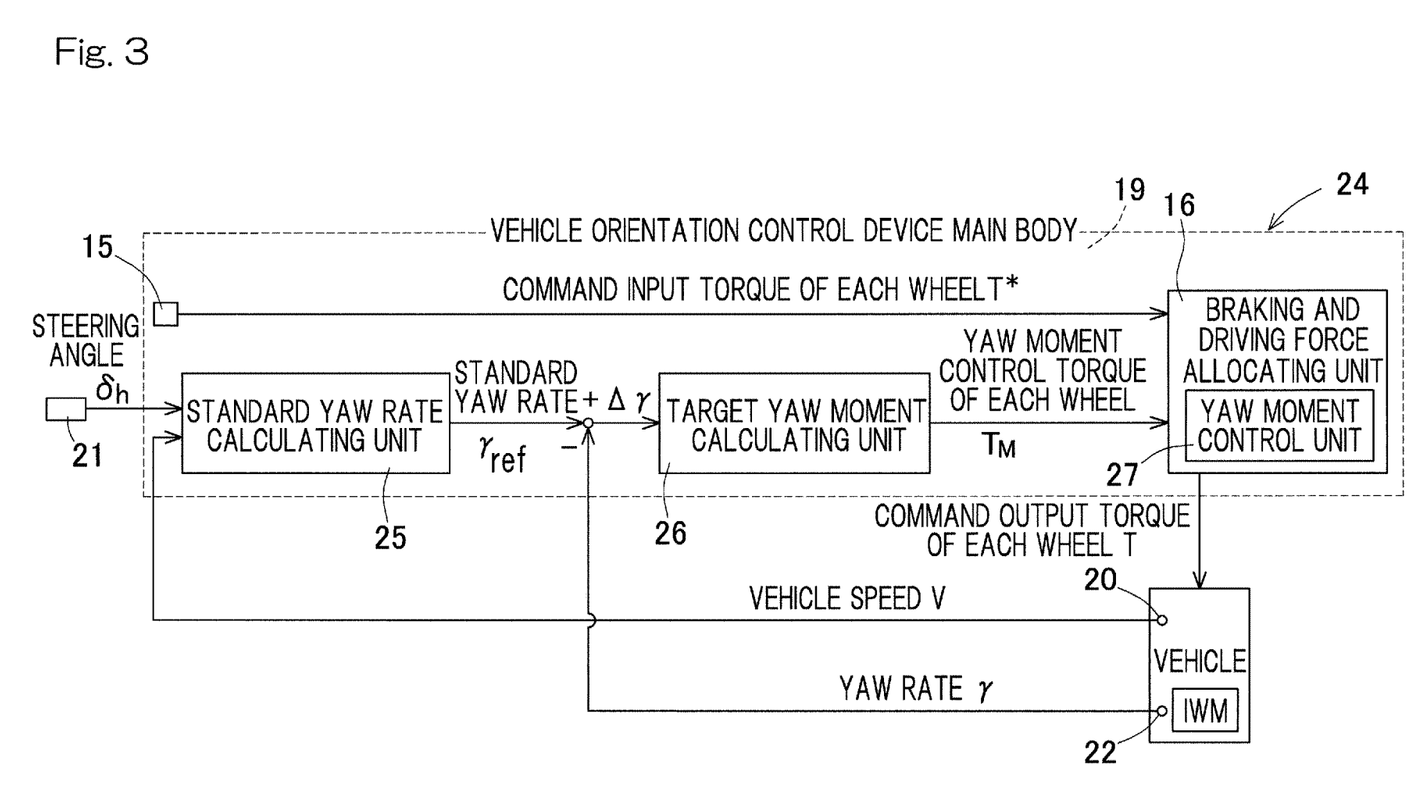
FIG. 3 is a control block diagram in the vehicle orientation control device.

FIG. 3 illustrates a control block diagram of the vehicle orientation control device 24 now under discussion. The standard yaw rate calculating unit 25 is constituted by a software function on a processor (not shown) or a hardware circuit capable of calculating and outputting the standard yaw rate $\gamma_{ref}$ on the basis of a vehicle model referred to below in reference to the vehicle velocity and the steering angle $\gamma_h$, influenced on a damping ratio and a natural vibration frequency $\omega_n$ mentioned below, specifically with the use of, for example, the above described realization model or the adding, multiplying, or dividing function or hardware that is a coprocessor equivalent thereto.

$$\gamma_{ref}(s) = G_\delta^r(0) \frac{\omega_n^2 (T_r s + 1)}{s^2 + 2\omega_n \zeta s + \omega_n^2} \delta_n(s) \quad \text{[Formula 1]}$$

In the formula set forth above, $G_\delta^r(0)$ represents the yaw rate gain constant, $\omega_n$ represents the natural vibration frequency of the automotive vehicle, $\zeta$ represents the damping ratio, $T_r$ represents the constant, and S represents Laplace Operator. It is to be noted that the counterclockwise yaw rate as viewed from top of the automobile vehicle is assumed to be positive. The vehicle speed is acquired from the vehicle speed detecting unit 20 and the steering angle is acquired from the steering angle sensor 21.

A target yaw moment calculating unit 26 is constituted by a software function on a processor (not shown) or a hardware circuit capable of calculating and outputting the target yaw moment Mt in the following manner, on the basis of the yaw rate deviation $\Delta\gamma$ ($\Delta\gamma=\gamma_{ref}-\gamma$) between the standard yaw rate $\gamma_{ref}$, which is determined by the standard yaw rate calculating unit 25, and the actual yaw rate $\gamma$ detected by the yaw rate sensor 22, specifically, with the use of, for example, the above described realization model or the multiplying function or hardware that is a coprocessor equivalent thereto.

$$M_t = K_p \Delta\gamma$$

wherein $K_p$ represents the gain constant.

The yaw moment calculating unit 26 calculates the yaw moment control torque $T_M$ for each of the wheels from the target yaw moment $M_t$, calculated as hereinabove, in the following manner. At the outset, from the target yaw moment $M_t$, the magnitude $T_{M\_ALL}$ of the yaw moment control torques in the automotive vehicle in its entirety with the use of the following formula. It is to be noted that $T_{M\_ALL}$ is the sum of the yaw moment control torques $T_M(T_{Mi})$ for the whole of the wheels and positive and negative of the sign represents the direction of rotation. Here, the yaw moment control torque $T_{Mi}$ (i=1, . . . , and 4) for each of the wheels is expressed by the following equations if the front wheel allocation ratio α defined by the front and rear allocation ratio (in which 0≤α≤1 and which the front and rear allocation ratio equal to 100:0 makes γ1 and the front and rear allocation ratio equal to 50:50 makes α 0.5) later is used:

$T_{M1} = T_{M2} = T_{M\_ALL} \times \alpha/2$ for each of the front wheels 3

$T_{M3} = T_{M4} = T_{M\_ALL} \times (1-\alpha)/2$ for each of the rear wheels 2.

$$\pm \frac{M_t}{d} r_0 \quad \text{[Formula 2]}$$

wherein d represents the tread of the vehicle and $r_o$ represents the tire radius. If the target yaw moment is negative ($M_t<0$), the braking torque is applied to the right wheel and the driving torque is applied to the left wheel, but if the target yaw moment is positive ($M_t>0$), the driving torque is applied to the right wheel and the braking torque is applied to the left wheel.

Also, distribution is made to the front and rear wheels according to the front and rear allocation ratio which has been calculated and the yaw moment control torques $T_M$ of each wheel is calculated.

The braking and driving force allocating unit 16 includes a yaw moment control unit 27. This yaw moment control unit 27 is constituted specifically by the previously described software function on a processor (not shown) or a hardware circuit capable of calculating and outputting the commend output torque T (FIG. 3) by adding the yaw moment control torque $T_M$, which is required to realize the target yaw moment $M_t$ calculated by the target yaw moment calculating unit 26, to the command input torque T* for each wheel, which is calculated by and outputted from the braking and driving force commanding unit 15 on the basis of, for example, the accelerator pedaling quantity, with the use of the above described realization model or an adding function or hardware which may be such as adder equivalent thereto.

$T_i = T_i^* + T_{Mi}$ (wherein $i = 1, \ldots,$ and 4)

It is to be noted that the foregoing equation is expressed for each of the automobile wheels, and i represent the numerical descriptive of each of the four wheels (For example, i=1, ..., and 4 represent the front left wheel, the front right wheel, the rear left wheel and the rear right wheel, respectively). Also, the yaw moment control unit 27 in this example is constituted as a part of the braking and driving force allocating unit 16, but it may be provided separately from the braking and driving force allocating unit 16.

Figure 4:
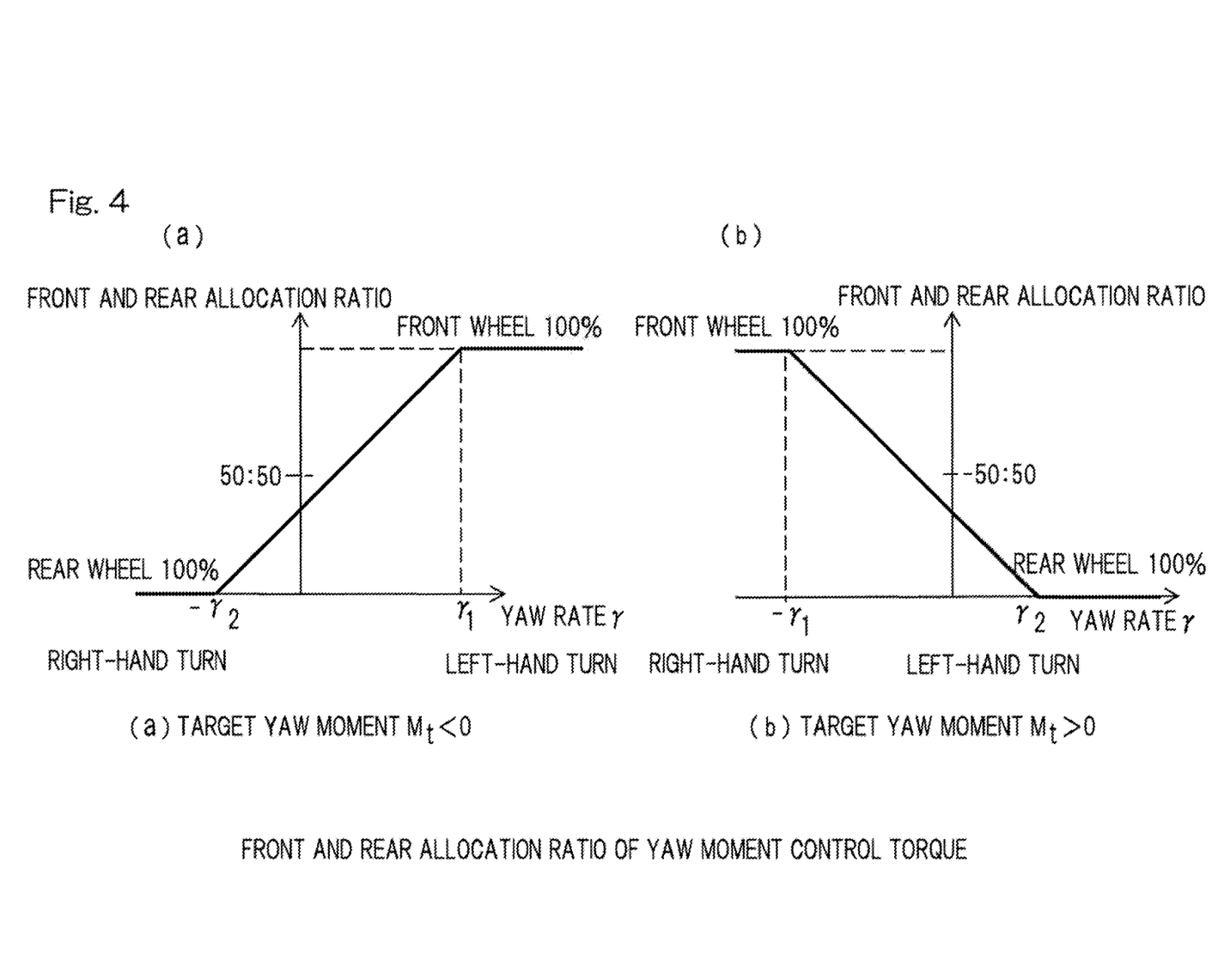
FIG. 4 is a diagram showing the front and rear allocation ratio of the yaw moment control torque in the vehicle orientation control device.

FIG. 4 illustrates a diagram descriptive of the front and rear allocation ratio of the yaw moment control torque exhibited by the vehicle orientation control device of the embodiment now under discussion. Hereinafter, reference is appropriately made to FIGS. 1A to 3 as the necessity arises. As shown in the graph (a) in FIG. 4, and FIG. 3, when the clockwise yaw moment is to be generated, the yaw moment control unit 27 determines the occurrence of an oversteering in the event that the target yaw moment is negative ($M_t<0$) and the actual yaw rate γ is higher than a predetermined yaw rate $\gamma_1$ (wherein $\gamma_1>0$), that is ($\gamma>\gamma_1$), and then adds, only to the front wheel 3, the yaw moment control torque required to realize such target yaw moment. In other words, the front and rear allocation ratio of the yaw moment control torque (or the front wheel allocation ratio α. Hereinafter the same.) is rendered to be 100% at the front wheel and 0% at the rear wheel. Accordingly, in the event of the oversteering with the automotive vehicle turning rightwards, the vehicle orientation can be stabilized.

The yaw moment control unit 27 determines the occurrence of understeering in the event that the target yaw moment is negative (that is, $M_t<0$) and the actual yaw rate γ is lower than the predetermined yaw rate $-\gamma_2$ ($\gamma_2>0$, however) (that is, $\gamma<-\gamma_2$), and then add the yaw moment control torque, required to realize the target yaw moment, only to the rear wheel 2. In other words, the front and rear allocation ratio of the yaw moment control torque is rendered to be 0% at the front wheel and 100% at the rear wheel. Accordingly, in the event of the understeering with the automotive vehicle turning rightwards, the course tracing property of the automotive vehicle can be improved. Also, the yaw moment control unit 27 is operated such that the yaw rate $\gamma_1$ is set to a value higher than the yaw rate $\gamma_2$ (the same applies even when the target yaw moment as described later is positive). The preset values $\gamma_1$ and $\gamma_2$ of those yaw rates are set in dependence on vehicle characteristics such as the position of the center of gravity of the automotive vehicle and/or the cornering power.

A allocation ratio varying unit 27a (FIG. 1B) of the yaw moment control unit 27 is caused to continuously change the front and rear allocation ratio of the yaw moment control torque to be distributed to the front and rear wheels 3 and 2 in dependence on the detected actual yaw rate in the event that the target yaw moment is negative (that is, $M_t<0$) and the actual yaw rate γ is within the range, between $-\gamma_2$ and $\gamma_1$, in which positive and negative of the sign invert (that is, $-\gamma_2 \leq \gamma \leq \gamma_1$). In this case, the yaw moment control unit 27 renders the allocation ratio of the rear wheel 2 to be increased during the straight run when the actual yaw rate γ is in proximity to "0" (zero). It is to be noted that the allocation ratio varying unit 27a is constituted specifically by a software function on a processor (not shown) or a hardware circuit capable of calculating and outputting the front and rear allocation ratio or the front wheel allocation ratio α with the use of the two characteristic graphs, shown in FIG. 4, in response to the input of the actual yaw rate γ using the above described realization model.

As shown in the graph (b) in FIG. 4, and FIG. 3, considering that generation of the left-hand yaw moment take place similarly, the yaw moment control unit 27 adds the yaw moment control torque, required to realize the target yaw moment, only to the rear wheel 2 in the event that the target yaw moment is positive (that is $M_t>0$) and the actual yaw rate γ is higher than the predetermined yaw rate $\gamma_2$. Accordingly, the course tracing property under the understeering with the automobile vehicle being turned leftward can be improved.

The yaw moment control unit 27 adds the yaw moment control torque, which is required to realize the target yaw moment, only to the front wheel 3 in the event that the target yaw moment is positive (that is $M_t>0$) and the actual yaw rate γ is lower than the predetermined yaw rate $-\gamma_1$. Accordingly, the vehicle orientation can be stabilized under the oversteering with the vehicle being turned leftwards.

The allocation ratio varying unit 27a (FIG. 1B) of the yaw moment control unit 27 causes the front and rear allocation ratio of the yaw moment control torque to be continuously changed, which ratio is allocated to the front and rear wheels 3 and 2 in dependence on the detected actual yaw rate γ in the event that the target yaw moment is positive (that is $M_t>0$) and the actual yaw rate γ is within the range between $-\gamma_1$ and $\gamma_2$ in which positive and negative of the sign change. In such case, the yaw moment control unit 27 renders the allocation ratio of the rear wheel 2 to be increased during the straight run when the actual yaw rate γ is in proximity to "0".

The yaw moment control unit 27 varies the preset values $\gamma_1$ and $\gamma_2$ of the yaw rate in dependence on the front and rear acceleration detected by the front and rear acceleration sensor 23 shown in FIG. 1B. More specifically, as the forward acceleration speed becomes high, $\gamma_1$ is increased and $\gamma_2$ is decreased. In other words, respective values of $\gamma_1$ and $-\gamma_2$ are increased, but respective values of $\gamma_2$ and $-\gamma_1$ are decreased, thereby increasing the front and rear allocation ratio of the braking and driving force of the rear wheel 2. Accordingly, influences brought about when the gripping force is lowered with reduction of the load on the front wheel 3 can be relieved and the vehicle behavior can be stabilized.

Assuming here that the yaw moment control torque to be applied to a certain wheel (hereinafter referred to as a wheel A) is different from the command input torque of the wheel on the frontward and rearward opposite but on the same side with respect to left and right (hereinafter referred to as a wheel B) as for the sign thereof, the yaw moment control unit 27 executes the following procedure. At the outset, the yaw moment control torque ought to be applied to the wheel A is applied to the wheel B (i.e., the yaw moment control torque to be originally applied to the wheel A is reduced if the yaw moment control torque is negative and the command input torque is positive). In the event that the sum of the command input torque of the wheel B and the yaw moment control torque to be originally applied to the wheel A does not exceed zero, the procedure are terminated.

On the other hand, in the event that the sum of the command input torque of the wheel B and the yaw moment control torque to be originally applied to the wheel A exceeds zero, the command output torque of the wheel B is rendered zero. Subsequently, the increment, over zero, of the sum of the command input torque of the wheel B and the yaw moment control torque to be originally applied to the wheel A is added to the command input torque of the wheel A, which is rendered to be a command output torque of the wheel A. The procedure discussed above is executed for each of the whole wheels. By so doing, the magnitude of the absolute value of the torque of the wheel (the wheel A then intended), to which the yaw moment control torque is applied, and that of the wheel (the opposite wheel B) on the front and rear opposite side can be lowered and, hence, the vehicle characteristics during the understeering and oversteering can be reduced respectively.

Figure 5:
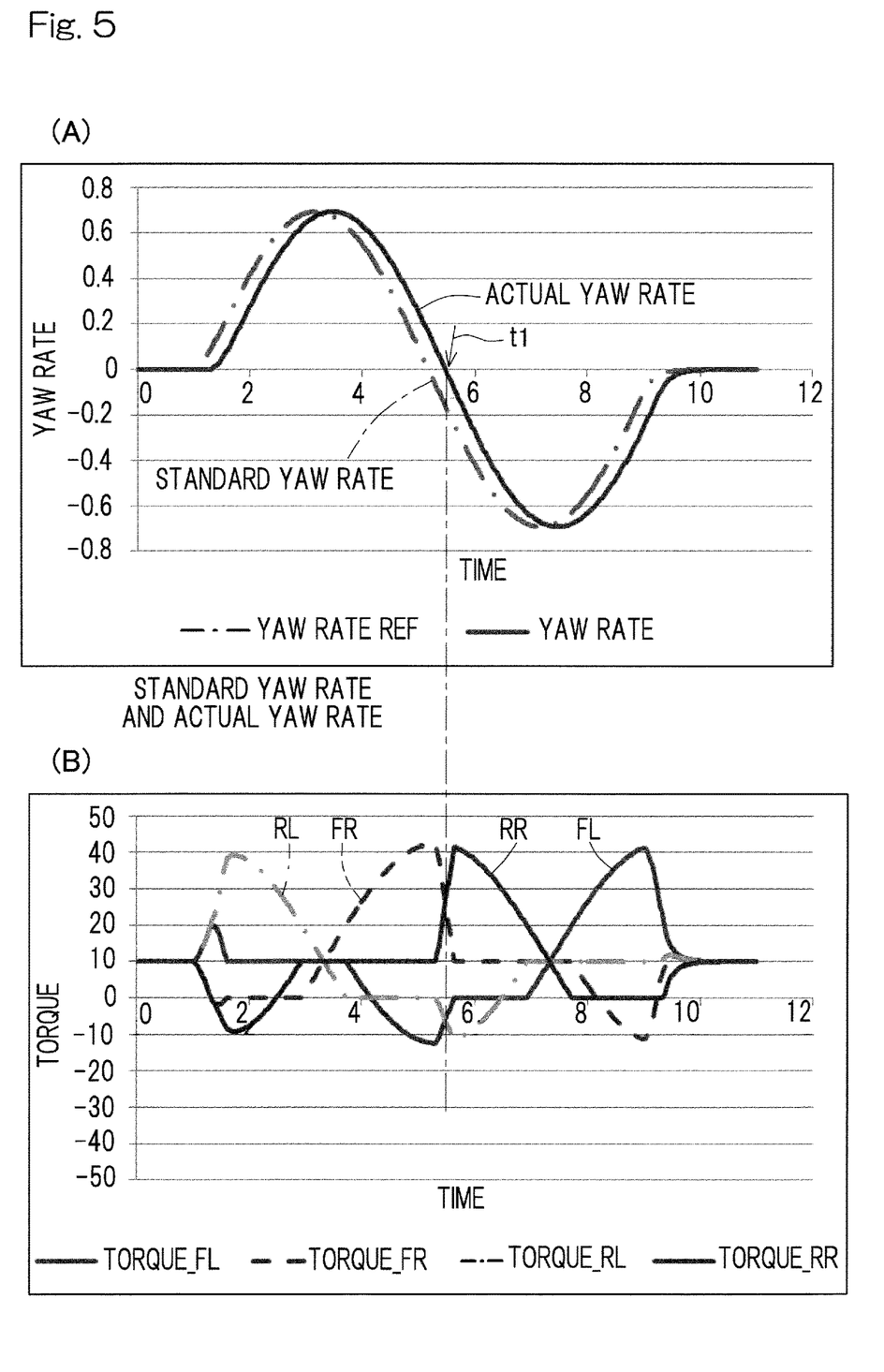
FIG. 5 shows a graph (A), which depicts a standard yaw rate and an actual yaw rate exhibited when a sign steering is conducted, and a graph (B) which depicts the yaw moment control to which the vehicle orientation device is applied.

FIG. 5 shows a graph (A) descriptive of the standard yaw rate and the actual yaw rate exhibited when a so-called sign steering takes place, respectively, and a graph (B) descriptive of the yaw moment control torque exhibited when the vehicle orientation control device of the present invention is applied. This example is a result of simulation in which the sign steering accompanying the inversion of positive and negative of the sign of the actual yaw rate is carried out. It is to be noted that during the simulation, a constant drive torque value of 10 is inputted as the command input torque T* to the four wheels and, hence, $\gamma_1=\gamma_2$. In the graph (b) of FIG. 5, the symbol "FL" represents the front left wheel yaw moment control torque, the symbol "FR" represents the front right wheel yaw moment control torque, the symbol "RR" represents the rear right wheel yaw moment control torque, and the symbol "RL" represents the rear left wheel yaw moment control torque. (The same applied to the graph (B).)

Figure 8:
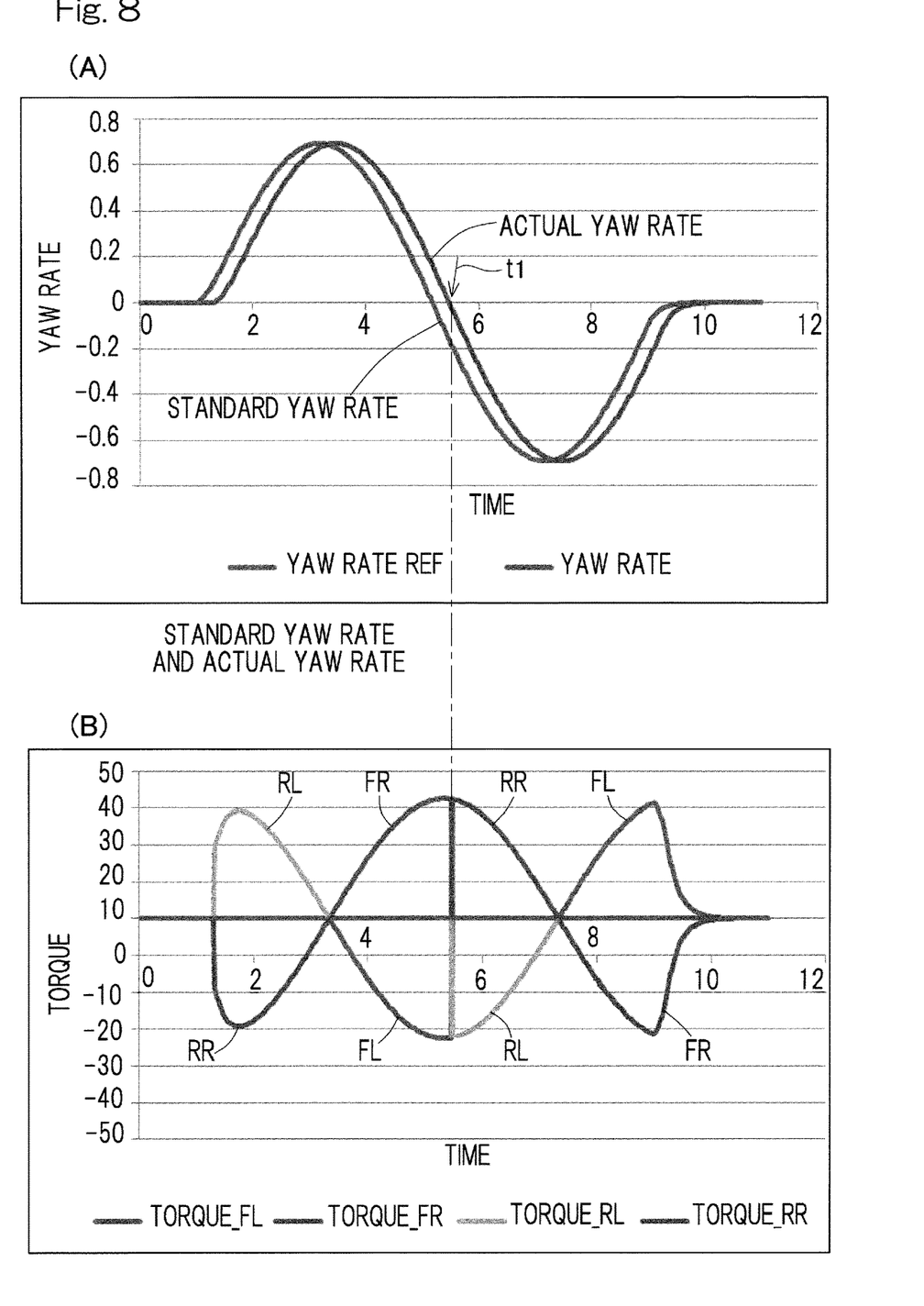
FIG. 8 shows a graph (A), which depicts the standard yaw rate and the actual yaw rate exhibited when the sign steering is conducted, and a graph (B) which depicts the yaw moment control in the conventional example.

With the conventional example to which the vehicle orientation control device of the embodiment now under discussion is not applied, when, as shown in the graph (A) of FIG. 8, the sign of the actual yaw rate inverts (at the arrow marking t1), the yaw moment control torque changes precipitously as shown in the graph (B) of FIG. 8. In such case, the torques of the front and rear wheels changes discontinuously, posing a problem that the vehicle drive will feel discomfort. On the other hand, according to the embodiment of the present invention now under discussion, when the sign of the actual yaw rate inverts as shown in the graph (A) of FIG. 5 (at the arrow marking t1), the yaw moment control torque can be continuously changed as shown in the graph (B) of FIG. 5.

Figure 6:
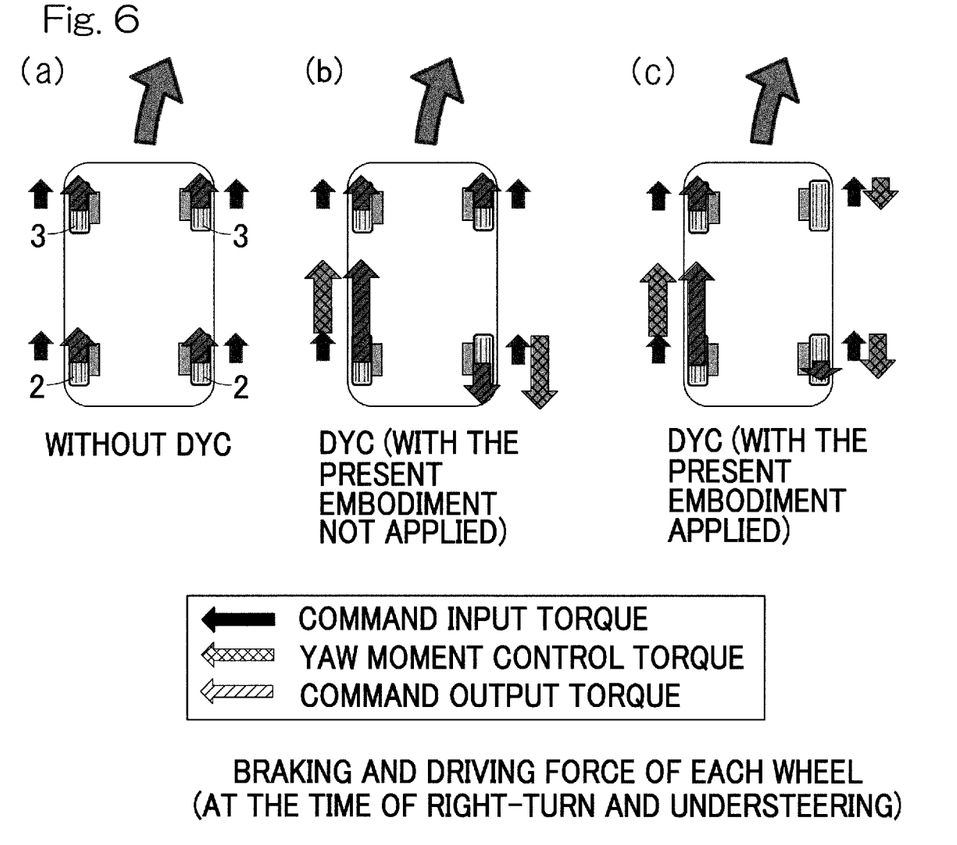
FIG. 6 is a schematic diagram showing an example of the braking and driving force on each of wheels during the occurrence of understeering when a right-hand turn takes place.

FIG. 6 is a schematic diagram showing an example of the braking and driving force on each of the wheels when the understeering takes place during the clockwise turn ($\gamma<-\gamma_2$, and the target yaw moment $M_r<0$). Without the yaw moment control (DYC) shown in an explanatory diagram (a) of FIG. 6, a constant driving force (command output torque) acts on the four wheels. With the conventional yaw moment control (DYC) shown in an explanatory diagram (b) of FIG. 6, the driving force (yaw moment control torque) is added to the rear left wheel 2 relative to the command input torque and a braking force (yaw moment control torque) of a magnitude equal to the driving force is added to the rear right wheel 2 relative to the command input torque.

With the yaw moment control to which the vehicle orientation control device according to the embodiment now under discussion shown in an explanatory diagram (c) of FIG. 6 is applied, the driving force (yaw moment control torque) is added to the rear left wheel 2 relative to the command input torque and the command output torque of the front right wheel 3 becomes zero as a result of addition, to the front right wheel 3, of the braking force (yaw moment control torque) of a magnitude equal to the driving force, the remaining braking force (yaw moment control torque) being added to the rear right wheel 2. In such case, as compared with the conventional yaw moment control, the sum of the absolute values of the command output torques decreases and hence the vehicle stability is improved.

According to the vehicle orientation control device hereinabove described, the allocation ratio varying unit 27a of the yaw moment control unit 27, when the detected actual yaw rate γ is within the predetermined range ($-\gamma_2 \leq \gamma \leq \gamma_1$) in which the positive and negative of the sign inverts, continuously change the front and rear allocation ratio of the yaw moment control torque to be allocated to the front and rear wheels 3 and 2 in dependence on the detected yaw rate γ. Thus, since the front and rear allocation ratio of the yaw moment control torque to be allocated to the front and rear wheels 3 and 2 varies continuously at the time of inversion of the sign of the actual yaw rate, the vehicle orientation can be stabilized without allowing the vehicle driver to feel discomfort. Also, by setting and adjusting parameters of the front and rear allocation ratio in dependence on the vehicle characteristic, the front and rear acceleration and/or other factors, the response of the yaw rate can be increased.

The yaw moment control unit 27, since the yew rate $\gamma_1$ is set to a value higher than the yaw rate $\gamma_2$, can increase the front and rear allocation ratio of the braking and driving force of the rear wheel 2 higher than that of the front wheel 3 during the straight run when the actual yaw rate γ is in proximity to "0". Accordingly, the understeering tendency from the time of straight run to that of start of the steering can be suppressed, and the yaw rate response can be improved.

Another embodiment of the present invention will now be descried. In the in-wheel motor drive device IWM, any of various speed reducing gears such as a cycloid type speed reducer, a planetary speed reducer, a dual axle speed reducer can be employed, and may be a so-called direct motor type in which no speed reducing gear is employed. Provision of a radar or an imaging unit (a radar or the like) capable of detecting obstacle or other matter may be made in the automotive vehicle, and the braking and driving force commanding unit 15 may be designed so as to generate the command input torque on the basis of data given from the radar or the like.

Figure 7:
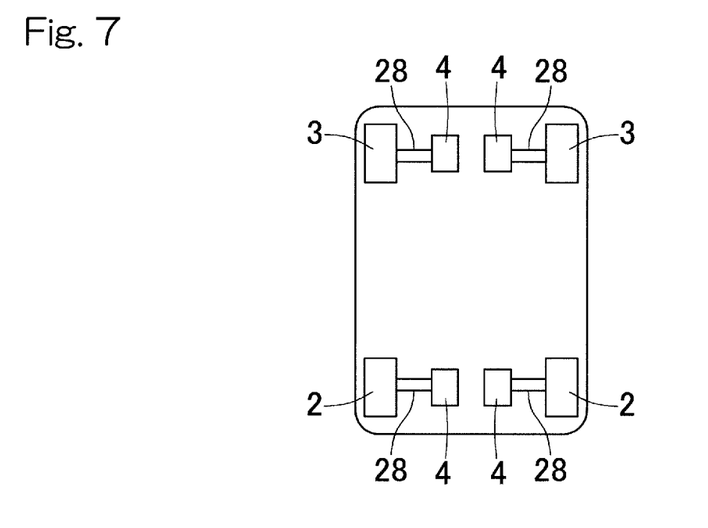
FIG. 7 is a diagram showing an conceptual construction of the automotive vehicle on which the vehicle orientation control device according to an alternative embodiment of the present invention is mounted.

In the description hereinabove set forth, reference has been made to the use of the four wheel drive vehicle of a type utilizing the in-wheel motor system, the present invention can be equally applied to, for example, such a four wheel drive vehicle having incorporated therein a mechanism in which output of the motor 4 mounted on the vehicle body in correspondence with each of the front and rear wheels 3 and 2 are transmitted to the front and rear wheels 3 and 2 through respective drive shafts 28 to independently control the respective drive torques of the front and rear wheels 3 and 2 show in FIG. 7 (without in-wheel motor system) or a mechanism mounted on the front and rear wheels to enable the respective torques on the left and right wheel to be independently displaced as desired.

Although in the foregoing description the present invention has been fully described in connection with the preferred embodiments thereof, with reference to the accompanying drawings, the embodiments of the present invention herein shown and described are only for the purpose of illustration and are not intended to limit the scope of the present invention in any way whatsoever. The scope of the present invention should rather be construed based on and in reference to the accompanying claims, not the foregoing description made. Those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto and the scope equivalent thereto, to be construed as included therein.

REFERENCE NUMERALS 2, 3 . . . Wheel
4 . . . Motor (Braking and driving force generating unit)
10 . . . Vehicle control device
15 . . . Braking and driving force commanding unit
17 . . . Acceleration handling portion
18 . . . Brake handling portion
22 . . . Yaw rate sensor
24 . . . Vehicle orientation control device
25 . . . Standard yaw rate calculating unit
26 . . . Target yaw moment calculating unit
27 . . . Yaw moment control unit

What is claimed is:

1. A vehicle orientation control device provided in a vehicle control device configured to control a four wheel drive vehicle equipped with a braking and driving force generating unit to individually apply a braking and driving force to each of front left and right wheels and rear left and right wheels, the device comprising:
   a yaw rate sensor configured to detect an actual yaw rate of the automotive vehicle; and
   a computer including:
   a standard yaw rate calculating unit configured to determine a standard yaw rate from a vehicle speed and a steering angle;
   a target yaw moment calculating unit configured to calculate a target yaw moment on the basis of a yaw rate deviation between the standard yaw rate, determined by the standard yaw rate calculating unit, and the actual yaw rate, detected by the yaw rate sensor;
   a braking and driving force commanding unit configured to generate a command input torque of the braking and driving force to be distributed to each of the wheels on the basis of state quantities outputted respectively from an operating unit of the braking and driving force; and
   a yaw moment control unit configured to add a yaw moment control torque, which is necessary to realize the target yaw moment calculated by the target yaw moment calculating unit, to the command input torque of the braking and driving force generated by the braking and driving force commanding unit,
   wherein the yaw moment control unit includes an allocation ratio varying unit configured to continuously change a front and rear allocation ratio of the yaw moment control torque to be distributed to the front and rear wheels in dependence on the actual yaw rate, which is detected, in the event that the actual yaw rate, which has been detected by the yaw rate sensor, is within a predetermined region in which positive and negative of the sign change to each other, and
   wherein the yaw moment control unit operates:
   to add the yaw moment control torque, which is necessary to realize the target yaw moment, only to a front wheel in response to the command input torque from the braking and driving force commanding unit in the event that the target yaw moment is negative and the actual yaw rate is higher than a preset first yaw rate, the preset first yaw rate being greater than zero, and
   to add the yaw moment control torque, which is necessary to realize the target yaw moment, only to a rear wheel in response to the command input torque from the braking and driving force commanding unit in the event that the target yaw moment is negative and the actual yaw rate is lower than a preset second yaw rate, the preset second yaw rate being less than zero, which is preset separately of the preset first yaw rate.

2. The vehicle orientation control device as claimed in claim 1, wherein the yaw moment control unit is operated such that an absolute value of the preset first yaw rate is set to a value higher than an absolute value of the preset second yaw rate.

3. The vehicle orientation control device as claimed in claim 2, further comprising a front and rear acceleration sensor configured to detect front and rear acceleration of the automotive vehicle, wherein the yaw moment control unit is designed that as the absolute value of the preset first yaw rate is increased and the absolute value of the preset second yaw rate is decreased, with increase of the front and rear acceleration detected by the front and rear acceleration sensor.

4. The vehicle orientation control device as claimed in claim 1, further comprising a front and rear acceleration sensor configured to detect front and rear acceleration of the automotive vehicle, wherein the yaw moment control unit is designed that an absolute value of the preset first yaw rate is increased and an absolute value of the preset second yaw rate is decreased, with increase of the front and rear acceleration detected by the front and rear acceleration sensor.

5. The vehicle orientation control device as claimed in claim 1, wherein the yaw moment control unit operates:

to add the yaw moment control torque, which is necessary to realize the target yaw moment, only to the rear wheel in response to the command input torque from the braking and driving force commanding unit in the event that the target yaw moment is positive and the actual yaw rate is higher than an absolute value of the preset second yaw rate, and to add the yaw moment control torque, which is necessary to realize the target yaw moment, only to the front wheel in response to the command input torque from the braking and driving force commanding unit in the event that the target yaw moment is positive and the actual yaw rate is lower than a negative value of the preset first yaw rate, which is preset separately of the preset second yaw rate.

6. A vehicle orientation control device provided in a vehicle control device configured to control a four wheel drive vehicle equipped with a braking and driving force generating unit to individually apply a braking and driving force to each of front left and right wheels and rear left and right wheels, the device comprising:
a yaw rate sensor configured to detect an actual yaw rate of the automotive vehicle; and
a computer including:
a standard yaw rate calculating unit configured to determine a standard yaw rate from a vehicle speed and a steering angle;
a target yaw moment calculating unit configured to calculate a target yaw moment on the basis of a yaw rate deviation between the standard yaw rate, determined by the standard yaw rate calculating unit, and the actual yaw rate, detected by the yaw rate sensor;
a braking and driving force commanding unit configured to generate a command input torque of the braking and driving force to be distributed to each of the wheels on the basis of state quantities outputted respectively from an operating unit of the braking and driving force; and
a yaw moment control unit configured to add a yaw moment control torque, which is necessary to realize the target yaw moment calculated by the target yaw moment calculating unit, to the command input torque of the braking and driving force generated by the braking and driving force commanding unit,
wherein the yaw moment control unit includes an allocation ratio varying unit configured to continuously change a front and rear allocation ratio of the yaw moment control torque to be distributed to the front and rear wheels in dependence on the actual yaw rate, which is detected, in the event that the actual yaw rate, which has been detected by the yaw rate sensor, is within a predetermined region in which positive and negative of the sign change to each other, and
wherein the yaw moment control unit operates:
to add the yaw moment control torque, which is necessary to realize the target yaw moment, only to a rear wheel in response to the command input torque from the braking and driving force commanding unit in the event that the target yaw moment is positive and the actual yaw rate is higher than a preset second yaw rate, the preset second yaw rate being greater than zero, and
to add the yaw moment control torque, which is necessary to realize the target yaw moment, only to a front wheel in response to the command input torque from the braking and driving force commanding unit in the event that the target yaw moment is positive and the actual yaw rate is lower than a preset first yaw rate, the preset first yaw rate being less than zero, which is preset separately of the preset second yaw rate.

7. The vehicle orientation control device as claimed in claim 6, wherein the yaw moment control unit is operated such that an absolute value of the preset first yaw rate is set to a value higher than an absolute value of the preset second yaw rate.

8. The vehicle orientation control device as claimed in claim 6, further comprising a front and rear acceleration sensor configured to detect front and rear acceleration of the automotive vehicle, wherein the yaw moment control unit is designed that an absolute value of the preset first yaw rate is increased and an absolute value of the preset second yaw rate is decreased, with increase of the front and rear acceleration detected by the front and rear acceleration sensor.

9. A vehicle orientation control device provided in a vehicle control device configured to control a four wheel drive vehicle equipped with a braking and driving force generating unit to individually apply a braking and driving force to each of front left and right wheels and rear left and right wheels, the device comprising:
a yaw rate sensor configured to detect an actual yaw rate of the automotive vehicle; and
a computer including:
a standard yaw rate calculating unit configured to determine a standard yaw rate from a vehicle speed and a steering angle;
a target yaw moment calculating unit configured to calculate a target yaw moment on the basis of a yaw rate deviation between the standard yaw rate, determined by the standard yaw rate calculating unit, and the actual yaw rate, detected by the yaw rate sensor;
a braking and driving force commanding unit configured to generate a command input torque of the braking and driving force to be distributed to each of the wheels on the basis of state quantities outputted respectively from an operating unit of the braking and driving force; and
a yaw moment control unit configured to add a yaw moment control torque, which is necessary to realize the target yaw moment calculated by the target yaw moment calculating unit, to the command input torque of the braking and driving force generated by the braking and driving force commanding unit,
wherein the yaw moment control unit includes an allocation ratio varying unit configured to continuously change a front and rear allocation ratio of the yaw moment control torque to be distributed to the front and rear wheels in dependence on the actual yaw rate, which is detected, in the event that the actual yaw rate, which has been detected by the yaw rate sensor, is within a predetermined region in which positive and negative of the sign change to each other,
wherein the yaw moment control unit adds the yaw moment control torque, necessary to realize the target yaw moment, to a contra-wheel which is on the side opposite to a wheel of interest with respect to the front and rear, but on the same side of the wheel of interest with respect to the left and right, in the event that the yaw moment control torque necessary to realize the target yaw moment in the wheel of interest has a sign different from that of the command input torque from the braking and driving force commanding unit on the contra-wheel;
wherein, when the sum of the command input torque, from the braking and driving force commanding unit, and the yaw moment control torque, required to realize the target yaw moment, does not exceed over zero, the value thereof is rendered to be a braking and driving force to be distributed to such contra-wheel; and wherein, when the sum of the command input torque, from the braking and driving force commanding unit, and the yaw moment control torque, required to realize the target yaw moment, exceeds over zero, the braking and driving force to be distributed to such contra-wheel is rendered to be zero and the increment over zero is added to the wheel of interest.

* * * * *

UNITED STATES PATENT AND TRADEMARK OFFICE
CERTIFICATE OF CORRECTION

PATENT NO. : 10,974,706 B2
APPLICATION NO. : 15/566466
DATED : April 13, 2021
INVENTOR(S) : Tomohiro Sugai Page 1 of 1

It is certified that error appears in the above-identified patent and that said Letters Patent is hereby corrected as shown below:

In the Claims

Column 14, Line 54:
Claim 3, after "that" delete "as".

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*